(12) United States Patent
Zhu et al.

(10) Patent No.: US 10,511,780 B2
(45) Date of Patent: Dec. 17, 2019

(54) DETECTING DEVICE, AND METHOD FOR CONTROLLING THE SAME

(71) Applicants: BOE Technology Group Co., Ltd., Beijing (CN); Hefei Xinsheng Optoelectronics Technology Co., Ltd., Hefei, Anhui (CN)

(72) Inventors: Lixin Zhu, Beijing (CN); Ke Dai, Beijing (CN); Chunyang Nie, Beijing (CN); Wenwu Lu, Beijing (CN); Shenghua Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 54 days.

(21) Appl. No.: 15/815,002

(22) Filed: Nov. 16, 2017

(65) Prior Publication Data

US 2018/0295291 A1    Oct. 11, 2018

(30) Foreign Application Priority Data

Apr. 7, 2017    (CN) .......................... 2017 1 0223693

(51) Int. Cl.
*G06T 7/13*    (2017.01)
*G06T 7/73*    (2017.01)
(Continued)

(52) U.S. Cl.
CPC ........... *H04N 5/23296* (2013.01); *G06T 7/13* (2017.01); *G06T 7/74* (2017.01); *H04N 5/247* (2013.01)

(58) Field of Classification Search
CPC ...... H04N 5/23296; H04N 5/247; G06T 7/74; G06T 7/13; G01B 11/005; G01B 21/047
(Continued)

(56) References Cited

U.S. PATENT DOCUMENTS 6,727,885 B1 * 4/2004 Ishino ................... G06F 3/0325
345/156
2009/0257050 A1 * 10/2009 Pertzov .............. G01N 21/8806
356/237.1

(Continued)

FOREIGN PATENT DOCUMENTS

CN        101446798 A        6/2009
CN        101464751 A        6/2009
(Continued)

OTHER PUBLICATIONS

Office Action dated Nov. 5, 2018 for Chinese Application : 201710223693.4.

*Primary Examiner* — Marnie A Matt
(74) *Attorney, Agent, or Firm* — Arent Fox LLP; Michael Fainberg (57) ABSTRACT

Disclosed are a detecting device, and a method for controlling the same, and the detecting device includes: a controller, and a detector and at least one image acquirer which are electrically connected respectively with the controller, wherein the detector includes a receiver; the image acquirer is arranged on a side of the detector away from the receiver and has an adjustable shooting angle; and the controller is configured to control the image acquirer to acquire images of at least two adjacent sides of a detected rectangular plane, and to determine the position of the detector on the detected rectangular plane according to the shooting angle of the image acquirer and the acquired images of the sides.

20 Claims, 4 Drawing Sheets

(51) Int. Cl.
*H04N 5/232* (2006.01)
*H04N 5/247* (2006.01)

(58) Field of Classification Search
USPC .......................................... 348/125
See application file for complete search history.

(56) References Cited

U.S. PATENT DOCUMENTS

| | | | |
|---|---|---|---|
| 2011/0074674 A1* | 3/2011 | Walberg | G06F 3/0418 345/158 |
| 2012/0189227 A1 | 7/2012 | Cohen | |
| 2012/0293812 A1* | 11/2012 | Sharonov | A61B 5/1076 356/625 |
| 2015/0009182 A1* | 1/2015 | Kuba | G06F 3/0412 345/175 |
| 2015/0049186 A1 | 2/2015 | Pettersson et al. | |
| 2016/0019424 A1 | 1/2016 | Liu et al. | |
| 2016/0057406 A1* | 2/2016 | Perriollat | G01B 11/245 348/48 |

FOREIGN PATENT DOCUMENTS

| | | | | |
|---|---|---|---|---|
| CN | 201600835 U | 10/2010 | | |
| CN | 103988049 A | 8/2014 | | |
| CN | 105320361 A | 2/2016 | | |
| EP | 0871027 A2 * | 10/1998 | ....... | G01N 21/95684 |
| KR | 20040014763 A | 2/2004 | | |
| WO | 03017076 A1 | 2/2003 | | |

* cited by examiner

| S201 | The controller controls the image acquirer to acquire images of at least two adjacent sides of the detected rectangular plane, and determines the position of the detector on the detected rectangular plane according to a shooting angle of the image acquirer and the acquired images of the sides |

DETECTING DEVICE, AND METHOD FOR CONTROLLING THE SAME

CROSS-REFERENCE TO RELATED APPLICATION

This application claims priority of Chinese Patent Application No. 201710223693.4, filed on Apr. 7, 2017, which is hereby incorporated by reference in its entirety.

FIELD

The present disclosure relates to the field of optical testing, and particularly to a detecting device, and a method for controlling the same.

BACKGROUND

As there is a rapid development in the field of display panels, there is a growing demand for display panel products with a better display effect, and thus for the display panel products with improved parameters including color gamut, type of backlight, response speed, grayscale deepness, color rendering, etc., so an optical characteristic of the display panel products is of particular importance.

At present, an optical test is generally performed on a display panel using a color analyzer. There is a non-uniform optical characteristic on the display panel, that is, there is a different optical characteristic at a different position on the display panel, for example, there is different display brightness at a different position on the display panel. During the optical test, a testing person generally determines a target positional point (the position of an optical detector on the display panel) roughly using his or her unaided eyes, or positions the target positional point roughly using a tessellated pattern or another assistant pattern due to a difference in optical characteristic between different positional points.

SUMMARY

An embodiment of the disclosure provides a detecting device including: a controller, and a detector and at least one image acquirer electrically connected which are respectively with the controller, wherein: the detector includes a receiver; the image acquirer is arranged on a side of the detector away from the receiver and has an adjustable shooting angle; and the controller is configured to control the image acquirer to acquire images of at least two adjacent sides of a detected rectangular plane, and to determine the position of the detector on the detected rectangular plane according to the shooting angle of the image acquirer acquires the images and the acquired images of the sides.

In a possible implementation, in the detecting device above according to embodiments of the disclosure, the image acquirer includes: a first image acquirer configured to acquire an image of a first side of the detected rectangular plane; and a second image acquirer configured to acquire an image of a second side of the detected rectangular plane, wherein: the first side and the second side are two adjacent sides of the detected rectangular plane.

In a possible implementation, in the detecting device above according to embodiments of the disclosure, an orthographic projection of a straight line where the shooting direction of the first image acquirer lies, onto the detected rectangular plane is perpendicular to an orthographic projection of a straight line wherein the shooting direction of the second image acquirer lies, onto the detected rectangular plane.

In a possible implementation, in the detecting device above according to embodiments of the disclosure, a shooting angle between the first image acquirer and an extension direction of the detector is adjustable; and a shooting angle between the second image acquirer and the extension direction of the detector is adjustable.

In a possible implementation, in the detecting device above according to embodiments of the disclosure, the first image acquirer and the second image acquirer are positioned at the same distance from the receiver.

In a possible implementation, in the detecting device above according to embodiments of the disclosure, the detecting device further includes: a display component electrically connected with the controller; the display component is configured to display detection information; and the controller is further configured to display on the display component the position of the detector on the detected rectangular plane.

In a possible implementation, in the detecting device above according to embodiments of the disclosure, the detected rectangular plane is a display panel.

In a possible implementation, in the detecting device above according to embodiments of the disclosure, the detector is an optical detector.

An embodiment of the disclosure further provides a method for controlling the detecting device above, the method includes: controlling, by the controller, the image acquirer to acquire the images of the at least two adjacent sides of the detected rectangular plane, and determining the position of the detector on the detected rectangular plane according to according to the angle at which the image acquirer acquires the images, and the acquired images of the sides.

In a possible implementation, in the controlling method above according to embodiments of the disclosure, the image acquirer includes a first image acquirer and a second image acquirer; and controlling, by the controller, the image acquirer to acquire the images of the at least two adjacent sides of the detected rectangular plane includes: controlling, by the controller, the first image acquirer to acquire an image of a first side of the detected rectangular plane, and the second image acquirer to acquire an image of a second side adjacent to the first side.

In a possible implementation, in the controlling method above according to embodiments of the disclosure, determining, by the controller, the position of the detector on the detected rectangular plane according to the shooting angle of the image acquirer and the acquired images of the sides includes: determining, by the controller, edge information of the first side and the second side respectively according to the acquired images of the first side and the second side; and determining, by the controller, the position of the detector on the detected rectangular plane according to the edge information of the first side and the second side, the shooting directions of the first image acquirer and the second image acquirer and a shooting ratio; and wherein the shooting ratio is a ratio of a size of a real object to a size of the real object in the image acquired by the first image acquirer or the second image acquirer.

In a possible implementation, in the controlling method above according to embodiments of the disclosure, determining, by the controller, the edge information of the first side and the second side respectively according to the acquired images of the first side and the second side includes: filtering, by the controller, the images of the first side and the second side respectively; enhancing, by the controller, edges of the filtered images of the first side and the second side respectively; and detecting, by the controller, the enhanced edges of the images of the first side and the second side respectively to determine the edge information of the first side and the second side.

In a possible implementation, in the controlling method above according to embodiments of the disclosure, controlling, by the controller, the first image acquirer to acquire the image of the first side of the detected rectangular plane, and the second image acquirer to acquire the image of the second side adjacent to the first side includes: controlling, by the controller, the first image acquirer to acquire the image of the first side in the direction perpendicular to the first side, and the second image acquirer to acquire the image of the second side in the direction perpendicular to the second side.

In a possible implementation, in the controlling method above according to embodiments of the disclosure, the position of the detector on the detected rectangular plane is determined in equations of $X=h_1 \cdot \tan a + x \cdot \beta_1$, and $Y=h_2 \cdot \tan b + y \cdot \beta_2$.

X and Y represent a distance between the detector and the first side and a distance between the detector and the second side respectively, h1 and h2 represent a distance between the first image acquirer and the detected rectangular plane and a distance between the second image acquirer and the detected rectangular plane respectively, a represents an angle between a shooting direction of the first image acquirer and an extension direction of the detector, b represents an angle between the shooting direction of the second image acquirer and the extension direction of the detector, x represents a distance between a geometrical center of the image captured by the first image acquirer and the first side, y represents a distance between a geometrical center of the image captured by the second image acquirer and the second side, and $\beta_1$ and $\beta_2$ represent the shooting ratio of the first image acquirer and the second image acquirer.

An embodiment of the disclosure further provides a method for controlling a detecting device above, the method includes: acquiring images of at least two adjacent sides of a detected rectangular plane, and determining a position of a detector of the detecting device on the detected rectangular plane according to a shooting angle and acquired images of the sides.

In a possible implementation, in the controlling method above according to embodiments of the disclosure, acquiring the images of the at least two adjacent sides of the detected rectangular plane includes: acquiring respectively an image of a first side of the detected rectangular plane, and an image of a second side adjacent to the first side.

In a possible implementation, in the controlling method above according to embodiments of the disclosure, determining the position of the detector on the detected rectangular plane according to the shooting angle and the acquired images of the sides includes: determining edge information of the first side and the second side respectively according to the acquired images of the first side and the second side; and determining the position of the detector on the detected rectangular plane according to the edge information of the first side and the second side, the shooting directions of a first image acquirer of the detecting device and a second image acquirer of the detecting device and shooting ratio; and wherein the shooting ratio is a ratio of a size of a real object to a size of the real object in the images acquired by an image acquirer of the detecting device.

In a possible implementation, in the controlling method above according to embodiments of the disclosure, determining the edge information of the first side and the second side respectively according to the acquired images of the first side and the second side includes: filtering the images of the first side and the second side respectively; enhancing edges of filtered images of the first side and the second side respectively; and detecting enhanced edges of the images of the first side and the second side respectively to determine the edge information of the first side and the second side.

In a possible implementation, in the controlling method above according to embodiments of the disclosure, acquiring the image of the first side of the detected rectangular plane and the image of the second side adjacent to the first side includes: acquiring the image of the first side in a direction perpendicular to the first side, and acquiring the image of the second side in a direction perpendicular to the second side.

In a possible implementation, in the controlling method above according to embodiments of the disclosure, the position of the detector on the detected rectangular plane is determined in equations of: $X=h_1 \cdot \tan a + x \cdot \beta_1$, and $Y=h_2 \cdot \tan b + y \cdot \beta_2$; wherein X and Y represent a distance between the detector and the first side and a distance between the detector and the second side respectively, h1 and h2 represent a distance between the first image acquirer and the detected rectangular plane and a distance between the second image acquirer and the detected rectangular plane respectively, a represents an angle between the shooting direction of the first image acquirer and an extension direction of the detector, b represents an angle between the shooting direction and an extension direction of the detector, x represents a distance between a geometrical center of the image captured by the first image acquirer and the first side, y represents a distance between a geometrical center of the image captured by the second image acquirer and the second side, and $\beta_1$ and $\beta_2$ represent a shooting ratio of the first image acquirer and a shooting ratio of the second image acquirer.

DETAILED DESCRIPTION OF THE EMBODIMENTS

In view of the problem in the related art of failing to determining the position of a target positional point on a detected rectangular plane being tested, the embodiments of the disclosure provide a detecting device, and a method for controlling the same.

Optional implementations of the detecting device and the method for controlling the same according to embodiments of the disclosure will be described below in details with reference to the drawings. The sizes and shapes of respective components in the drawings are not intended to reflect a real proportion, but only to illustrate the disclosure of the disclosure.

Figure 1:
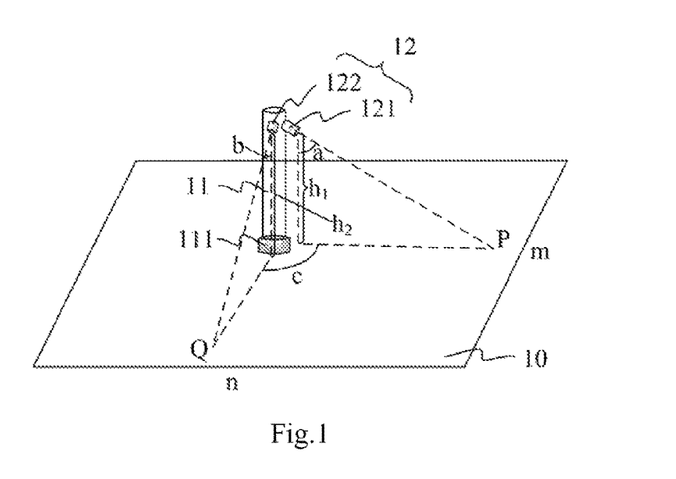
FIG. 1 is a schematic structural diagram of a detecting device according to an embodiment of the disclosure.
Figure 2:
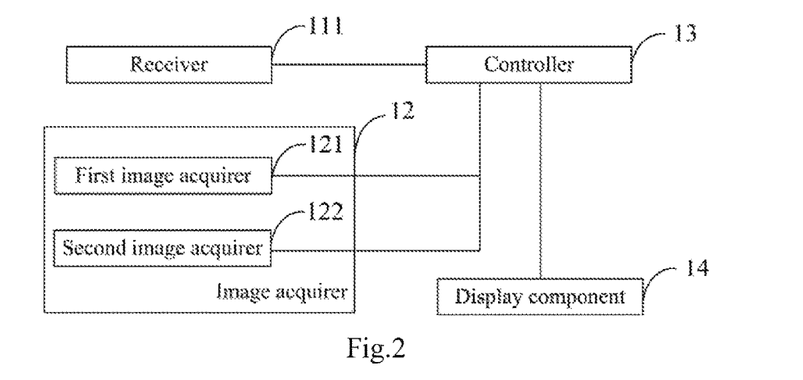
FIG. 2 is a first schematic logic diagram of the detecting device according to the embodiment of the disclosure.

FIG. 1 is a schematic structural diagram of a detecting device according to an embodiment of the disclosure, and FIG. 2 is a schematic logic diagram of the detecting device according to an embodiment of the disclosure; and referring to FIG. 1, and FIG. 2, the detecting device according to an embodiment of the disclosure includes: a controller 13, and a detector 11 and at least one image acquirer 12 which are electrically connected respectively with the controller 13.

The detector 11 includes a receiver 111.

The image acquirer 12 is arranged on the side of the detector away from the receiver 111 and has an adjustable shooting angle.

The controller 13 is configured to control the image acquirer 12 to acquire images of at least two adjacent sides of a detected rectangular plane 10, and to determine the position of the detector 11 on the detected rectangular plane 10 according to the shooting angle of the image acquirer 12, and the acquired images of the sides.

In the detecting device according to embodiments of the disclosure, the image acquirer is arranged on the side of the detector away from the receiver to acquire an image at an adjustable shooting angle, and the controller controls the image acquirer to acquire the images of at least two adjacent sides of the detected rectangular plane, and determines the position of the detector on the detected rectangular plane according to the shooting angle and the acquired images, so that the position of the detector on the detected rectangular plane being tested can be determined accurately to thereby alleviate an error in testing the detected rectangular plane.

In an optional implementation, the detected rectangular plane above may be any plane, and optionally a display panel, and the detector above can be any detector configured to detector a parameter of the detected plane, e.g., an optical detector, an electronic detector, etc., and optionally an optical detector. It shall be noted that, the detected plane is a display panel, and the detector is an optical detector, for example, throughout the embodiment of the disclosure, but particular types of the detected plane and the detector will not be limited thereto.

In a real application, the display panel can be tested using the optical detector to thereby obtain an optical characteristic of the display panel, where the body of the optical detector has some angle from the display panel being tested, and is optionally perpendicular to the display panel. The optical detector can acquire optical information on the display panel using the receiver arranged at one end of the body thereof, for example, acquire a flicker value, color coordinates, a brightness value, or other information of the display panel. The optical detector is electrically connected with the controller so that it can transmit the acquired optical information to the controller, and the controller can analyze the optical characteristic of the display panel according to the received optical information, and can also display an analysis result on a display component. In a real application, the optical detector above can be electrically connected with the controller in a wired or wireless manner, although embodiments of the disclosure will not be limited thereto.

Referring to FIG. 1, the body of the detector 11 is generally a column, a cross section of which can be a round, a triangle, a rectangle, etc. The image acquirer 12 arranged on the side of the detector 11 away from the receiver 111 can be arranged at any position on the detector 11 away from the receiver 111, e.g., the other end of the detector 11, a middle position on the detector 11, a position on the detector 11 above the middle thereof, etc., although the position of the image acquirer 12 will not be limited thereto. Furthermore a shooting angle of the image acquirer 12 arranged on the detector 11 is adjustable, and an image of an edge of the detected rectangular plane 10 with any different size can be acquired by adjusting the shooting angle, so the detecting device according to embodiments of the disclosure can be applicable to the detected rectangular plane 10 with any one of a number of sizes. In an optional implementation, the image acquirer 12 can be fixed on the detector 11 through a hinge or another connection component to thereby have an adjustable shooting angle. It shall be noted that in embodiments of the disclosure, the shooting angle refers to an angle between a direction at which the image acquirer 12 acquires an image, and a reference straight line, where the reference straight line may be a straight line where the extension direction of the detector 11 lies, or may be some straight line perpendicular to the extension direction of the detector 11, or may be embodied as any straight line, although embodiments of the disclosure will not be limited thereto; and the direction at which an image is acquired may refer to a direction from the image acquirer 12 to a real position corresponding to the geometrical center of the acquired image. As there is an adjustable shooting angle of the image acquirer 12, there is also an adjustable shooting direction, so the shooting angle or the shooting direction of the image acquirer 12 can be controlled to enable the image acquirer 12 to acquire an image in some range.

Optionally the image acquirer 12 is optionally a Charge-Coupled Device (CCD) camera, and the image acquirer 12 can be electrically connected with the controller 13 in a wired or wireless manner, and optionally in a wireless manner, for example, a Bluetooth module is integrated in the image acquirer 12, although particular components in the image acquirer 12, and how to connect the image acquirer 12 with the controller will not be limited thereto.

In order to determine the position of the detector 11 on the detected rectangular plane 10, the distances between the position of the detector 11, and the sides of the detected rectangular plane 10 respectively in the horizontal direction and the vertical direction need to be determined, so the image acquirer 12 needs to be controlled to capture at least two adjacent sides thereof, and the controller 13 can determine the position of the detector 11 on the detected rectangular plane 10 according to the shooting angle of the image acquirer 12 acquires an image, and the acquired images of the sides.

Optionally referring to FIG. 1 and FIG. 2 again, the image acquirer 12 in the detecting device above according to embodiments of the disclosure includes followings.

A first image acquirer 121 is configured to acquire an image of a first side of the detected rectangular plane 10.

A second image acquirer 122 is configured to acquire an image of a second side of the detected rectangular plane 10.

The first side and the second side are two adjacent sides of the detected rectangular plane 10.

As illustrated in FIG. 1, in an example in which the first side is the side m, and the second side is the side n as illustrated, the first image acquirer 121 is arranged facing the first side, and can be easily controlled to acquire an image of the first side of the detected rectangular plane being tested; and alike the image acquirer 122 is arranged facing the second side, and can be easily controlled to acquire an image of the second side.

The image acquirer 12 is arranged to include the first image acquirer 121 and the second image acquirer 122 in an optional implementation of embodiments of the disclosure, but the number of image acquirer 12 can alternatively be set in an optional implementation. For example, when there is one image acquirer 12, the image acquirer 12 can be controlled to firstly acquire an image of the first side, and then acquire an image of the second side through adjusting the shooting angle. Of course, more image acquirers 12 can be arranged, for example, when there are three image acquirers 12, the image acquirers 12 can be controlled to acquire images of the first side, the second side, and a third side (the side opposite to the side m) respectively so that the position of the detector 11 on the detected rectangular plane 10 can be determined according to results of the three image acquirers 12, where the position of the detector 11 in the horizontal direction can be calibrated using the image of the third side to thereby make the resulting position more accurate. Alike, four or more image acquirers 12 can be arranged, although the number of image acquirers 12 will not be limited thereto.

More particularly in the detecting device above according to embodiments of the disclosure, an orthographic projection, of a straight line where the shooting direction of the first image acquirer 121 lies, onto the detected rectangular plane 10 is perpendicular to an orthographic projection, of a straight line where the shooting direction of the second image acquirer 122 lies, onto the detected rectangular plane 10, that is, the angle c is equal to 90° as illustrated.

Taking the horizontal direction as an example, in order to determine the position of the detector 11 in the horizontal direction, the distance between the detector 11 and the side m (or the side opposite to the side m) needs to be determined, and if the shooting direction of the first image acquirer 121 is perpendicular to the extension direction of the side m, then the distance between the detector 11 and the side m will be easily obtained, so the orthographic projection, of the shooting direction of the first image acquirer 121, onto the detected rectangular plane 10 can be arranged perpendicular to the orthographic projection, of the shooting direction of the second image acquirer 122, onto the detected rectangular plane 10, so that only the direction of one of the two image acquirers 12 will be controlled to be perpendicular to the side of the detected rectangular plane 10 being tested to thereby operationally simplify the test.

Furthermore in the detecting device above according to embodiments of the disclosure, there is an adjustable angle, at which the first image acquirer 121 acquires an image, from the extension direction of the detector 11.

A shooting angle between the second image acquirer 122 and the extension direction of the detector 11 is adjustable.

In an optional implementation, as illustrated in FIG. 1, the shape of the detector 11 is generally a column, and the extension direction of the detector 11 may refer to the direction of the straight line where the axis of the detector 11 lies; or if the detector 11 is shaped in an irregular pattern, then the extension direction of the detector 11 may refer to the direction perpendicular to the detected rectangular plane 10 being tested. The shooting angle between the first image acquirer 121 and the extension direction of the detector 11 is the angle a as illustrated, and the shooting angle of the second image acquirer 122 and the extension direction of the detector 11 is the angle b as illustrated; and the sizes of the angle a and the angle b can be adjusted during the test to control the first image acquirer 121 and the second image acquirer 122 to acquire their corresponding sides so as to satisfy a demand for testing the detected rectangular plane with a different size, thus facilitating a more precise result of testing the detected rectangular plane. Furthermore the first image acquirer 121 and the second image acquirer 122 are controlled to acquire an image at an adjustable angle in only one direction, thus facilitating their operations during the test; and particularly when the orthographic projection of the shooting direction of the first image acquirer 121 onto the detected rectangular plane 10 is perpendicular to the orthographic projection of the shooting direction of the second image acquirer 122 onto the detected rectangular plane 10, the body of the detector 11 can be rotated so that the shooting directions of the first image acquirer 121 and the second image acquirer 122 are perpendicular respectively to their corresponding sides, and then the shooting angles between each of the first image acquirer 121 and the second image acquirer 122 and the extension direction of the detector 11 can be adjusted so that the first image acquirer 121 and the second image acquirer 122 acquire images of their corresponding sides.

In an optional implementation, in the detecting device above according to embodiments of the disclosure, the first image acquirer 121 and the second image acquirer 122 are positioned at the same distance from the receiver 111.

Since the first image acquirer 121 and the second image acquirer 122 are positioned at the same distance from the receiver 111, the distance between the first image acquirer 121 and the detected rectangular plane 10 being tested is the same as the distance between the second image acquirer 122 and the detected rectangular plane 10. A illustrated in FIG. 1, the distance between the first image acquirer 121 and the detected rectangular plane 10 is $h_1$, and the distance between the second image acquirer 122 and the detected rectangular plane 10 is $h_2$; and if the distance between the first image acquirer 121 and the detected rectangular plane 10 is the same as the distance between the second image acquirer 122 and the detected rectangular plane 10, then $h_1=h_2$ will hold true, so that only one of the distances between the first image acquirer 121 and the second image acquirer 122, and the detected rectangular plane 10 will be measured instead of both of the distances each time to thereby simplify the operating process. The first image acquirer 121 and the second image acquirer 122 are positioned at the same distance from the receiver 111 in an optional implementation of the embodiment of the disclosure, but the first image acquirer 121 and the second image acquirer 122 may alternatively be positioned at different distances from the receiver 111 as needed in a real application, although embodiments of the disclosure will not be limited thereto.

Figure 3:
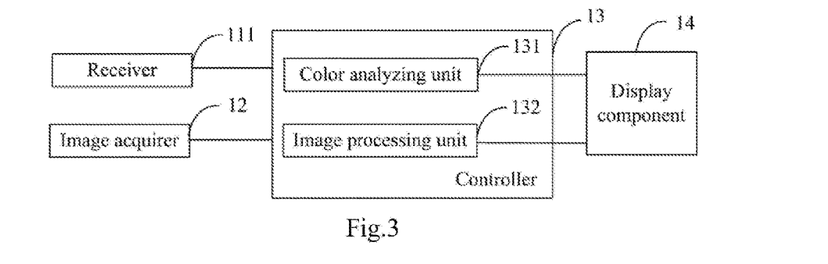
FIG. 3 is a second schematic logic diagram of the detecting device according to the embodiment of the disclosure.

In a real application, the detecting device above according to embodiments of the disclosure as illustrated in FIG. 2 and FIG. 3 can further include: a display component 14 electrically connected with the controller 13.

The display component is configured to display detection information.

The controller 13 is further configured to display on the display component the position of the detector 11 on the detected rectangular plane 10.

During a real test, frequently the same target positional point on different display panels needs to be optically tested respectively, or the same target positional point on the same display panel needs to be optically tested repeatedly, and the determined position of the optical detector on the display panel is displayed on the display component 14 so that the optical detector can be placed accurately at the position where the target positional point is located. For example, when the same target positional point on different display panels is optically tested respectively, positional coordinates of the target positional point are known, or can be obtained after the first display panel is tested, so the position of the optical detector is moved constantly during a subsequent test to make the positional coordinates displayed on the display component 14 agree with the known positional coordinates of the target position point so that the target positional point on the different display panels can be positioned accurately to thereby improve the accuracy of the optical test on the display panel. The same principle will apply to an optical test repeated on the same target positional point on the same display panel, so a repeated description thereof will be omitted here.

Optionally as illustrated in FIG. 3, the controller 13 can include a color analyzing unit 131 and an image processing unit 132, where the color analyzing unit 131 can analyze the display panel according to optical information of the display panel acquired by the receiver, and display an analysis result on the display component 14, and the image processing unit 132 can process the image acquired by the image acquirer 12, and analyze the image to calculate the position of the optical detector on the display panel.

Figure 4:
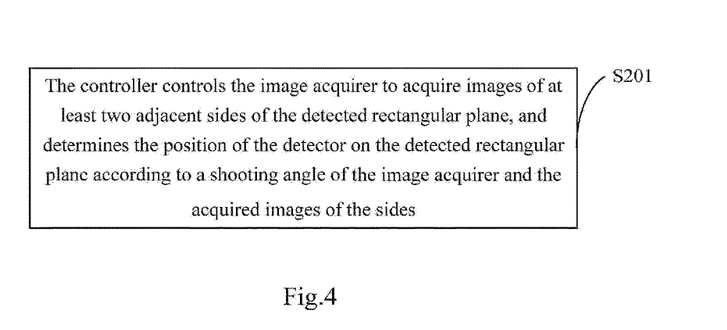
FIG. 4 is a first flow chart of a method for controlling the detecting device according to an embodiment of the disclosure.

Based upon the same idea, an embodiment of the disclosure further provides a method for controlling the detecting device above as illustrated in FIG. 4, where the method includes following steps.

In the step S201, the controller controls the image acquirer to acquire images of at least two adjacent sides of the detected rectangular plane, and to determine the position of the detector on the detected rectangular plane according to the shooting angle of the image acquirer and the acquired images.

In the method above for controlling the detecting device according to embodiments of the disclosure, the controller controls the image acquirer to acquire the images of at least two adjacent sides of the detected rectangular plane, and determines the position of the detector on the detected rectangular plane according to the shooting angle of the image acquirer and the acquired images, so that the position of the detector on the detected rectangular plane being tested can be determined accurately to thereby alleviate an error in testing the detected rectangular plane.

In an optional implementation, in the controlling method above according to embodiments of the disclosure, the image acquirer can include a first image acquirer and a second image acquirer.

In the step S201 above, the controller controls the image acquirer to acquire the images of at least two adjacent sides of the detected rectangular plane as follows.

The controller controls the first image acquirer to acquire an image of a first side of the detected rectangular plane, and the second image acquirer to acquire an image of a second side of the detected rectangular plane.

In a real application, the controller can analyze the images acquired by the first image acquirer and the second image acquirer, and the acquired images do not include any images of the sides, then the image acquirers will be controlled to change the shooting direction until the first image acquirer acquires an image of the first side, and the second image acquirer acquires an image of the second side.

When there are another number of image acquirers, it or they also can acquire images of at least two adjacent sides of the detected rectangular plane, for example, when there is only one image acquirer, the controller can firstly control the image acquirer to acquire an image of the first side, and then control the image acquirer to acquire an image of the second image at another shooting angle; and when there are three, four, or more image acquirers, the image acquirers can be controlled to acquire images of three or four sides of the detected rectangular plane, or acquire images of two sides thereof repeatedly, so that the determined position of the detector can be calibrated to thereby make the resulting position more accurate.

Optionally in the controlling method above according to embodiments of the disclosure, in the step S201 above, the controller can determine the position of the detector on the detected rectangular plane according to the shooting angle of the image acquirer, and the acquired images of the sides as follows.

The controller determines edge information of the first side and the second side respectively according to the acquired images of the first side and the second side.

The controller determines the position of the detector on the detected rectangular plane according to the edge information of the first side and the second side, the shooting directions of the first image acquirer and the second image and the shooting ratio of the first image acquirer and the second images.

Here the shooting ratio is the ratio of the size of a real object to the size of the real object in the image acquired by the first image acquirer or the second image acquirer.

Figure 5A:
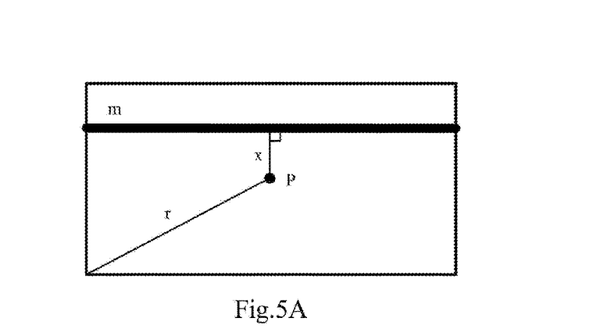
FIG. 5A is a first schematic diagram of an image on a first side according to the embodiment of the disclosure.

Since the grayscale of a side of the detected rectangular plane in the image acquired by the image acquirer is different from those at the other positions, the position of the side of the detected rectangular plane can be recognized by detecting the edge information. As illustrated in FIG. 5A, after the edge information of the first side (i.e., the side m) is obtained, the distance between the geometrical center point P of the image of the first side to the side m can be obtained, and referring to FIG. 1, the point P is the point at which the shooting direction of the first image acquirer 121 intersects with the detected rectangular plane 10; and furthermore the real distance between the point P and the side m can be obtained according to the shooting ratio of the first image acquirer 121 and the distance between the detector 11 and the point P can be calculated according to the shooting direction of the first image acquirer 121, so that the distance x between the detector 11 and the side m can be obtained.

Figure 5B:
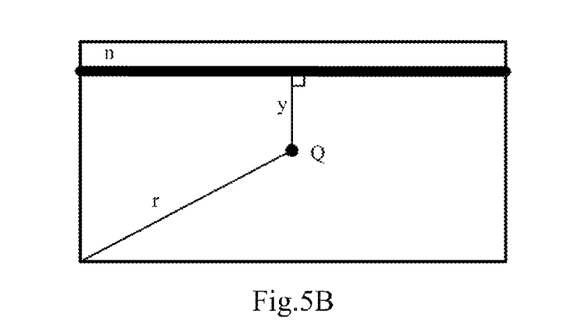
FIG. 5B is a first schematic diagram of an image on a second side according to the embodiment of the disclosure.

Referring to FIG. 5B, the distance between the detector 11 and the side n can be calculated alike, and particularly after the edge information of the second side (i.e., the side n) is obtained, the distance between the geometrical center point Q of the image of the second side to the side n can be obtained, and referring to FIG. 1, the point Q is the point at which the shooting direction of the second image acquirer 122 intersects with the detected rectangular plane 10; and furthermore the real distance between the point Q and the side n can be obtained according to the shooting ratio of the second image acquirer 122, and the distance between the detector 11 and the point Q can be calculated according to the shooting direction of the second image acquirer 122, so that the distance y between the detector 11 and the side n can be obtained.

The shooting ratio is the ratio of the size of a real object to the size of the real object in the image acquired by the first image acquirer or the second image acquirer, and referring to FIG. 5A, after the image acquired by the first image acquirer is obtained, the image can be processed to obtain the distance r between the geometrical center point P and the vertex of the angle between two adjacent sides of the image, and then the distance R between the point P and the real object corresponding to the vertex of the image can be measured to thereby obtain the shooting ratio, i.e., R/r; and the shooting ratio at which the second image acquirer acquires the image can be obtained alike. Of course, the shooting ratio of the image is acquired can alternatively be determined otherwise, for example, the image acquirer can be controlled to acquire directly a labeled scale to thereby easily obtain the size of the real object, so the shooting ratio can be obtained easily at the shooting angle at which the image is acquired, although embodiments of the disclosure will not be limited thereto.

Figure 6:
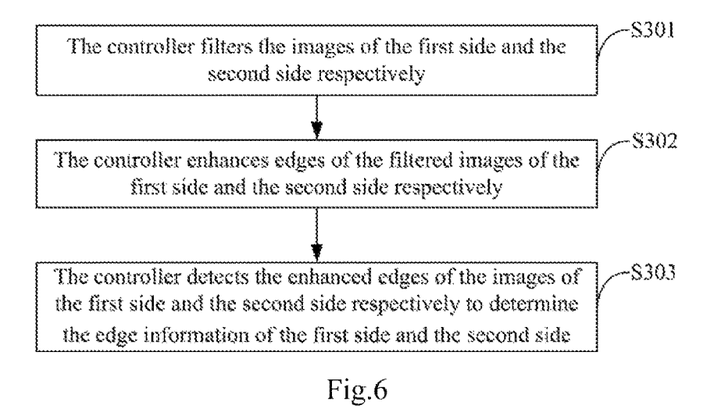
FIG. 6 is a second flow chart of a method for controlling the detecting device according to an embodiment of the disclosure.

More particularly in the controlling method above according to embodiments of the disclosure, as illustrated in FIG. 6, the controller determines the edge information of the first side and the second side respectively according to the acquired images of the first side and the second side as follows.

In the step S301, the controller filters the images of the first side and the second side respectively.

In the step S302, the controller enhances edges of the filtered images of the first side and the second side respectively.

In the step S303, the controller detects the enhanced edges of the images of the first side and the second side respectively to determine the edge information of the first side and the second side.

Filtering in the step S301 above is optionally Gaussian filtering, where the images of the first side and the second side are filtered to thereby remove interference of noise in the images so as to improve the accuracy of the processing result. In the step S302 above, the edges of the images are enhanced to thereby make the edge information of the images more pronounced so that the edges of the sides can be subsequently recognized more easily. In the step S303 above, the edges of the images are detected to thereby detect the edge information of the first side and the second side so as to determine the positions of the first side and the second side in the image.

Furthermore in the controlling method above according to embodiments of the disclosure, the controller controls the first image acquirer to acquire the image of the first side of the detected rectangular plane, and the second image acquirer to acquire the image of the second side of the detected rectangular plane as follows.

The controller controls the first image acquirer to acquire the image of the first side in the direction perpendicular to the first side, and the second image acquirer to acquire the image of the second side in the direction perpendicular to the second side.

Figure 7A:
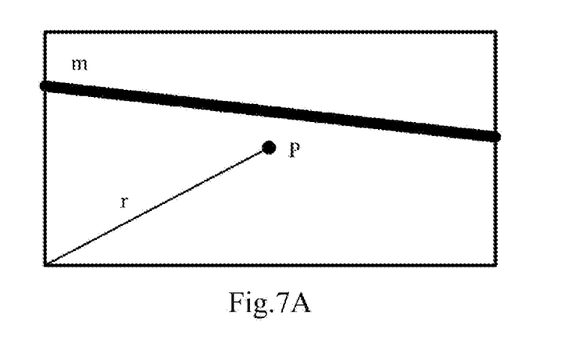
FIG. 7A is a second schematic diagram of an image on the first side according to the embodiment of the disclosure.
Figure 7B:
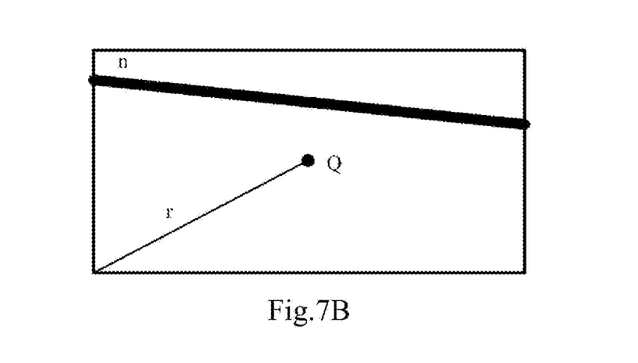
FIG. 7B is a second schematic diagram of an image on the second side according to the embodiment of the disclosure.

Referring to FIG. 1, FIG. 5A, and FIG. 5B, the first image acquirer 121 is controlled to acquire the image of the first side in the direction perpendicular to the first side, where the distance between the detector 11 and the side m is the sum of the distance between the detector 11 and the point P and the distance between the point P and the side m, and the distance between the detector 11 and the side n is the sum of the distance between the detector 11 and the point Q and the distance between the point Q and the side n, so there is a lower computing effort, and the distances are easier to calculate, as compared with another instance than this instance. Furthermore as illustrated in FIG. 7A and FIG. 7B, when the shooting direction of the first image acquirer 121 is not perpendicular to the extension direction of the side m, and when the shooting direction of the second image acquirer 122 is not perpendicular to the extension direction of the side n, the position of the detector 11 can be calculated by converting its spatial coordinates, but there is a significantly increased computing effort as compared with the instance in FIG. 5A and FIG. 5B in which the first image acquirer 121 acquires the image of the first side in the direction perpendicular to the first side, and the second image acquirer 121 acquires the image of the second side in the direction perpendicular to the second side.

More particularly in the controlling method above according to embodiments of the disclosure, in the instance in which the shooting angle of the first image acquirer is perpendicular to the first side, and the shooting angle of the second image acquirer is perpendicular to the second side, the position of the detector on the detected rectangular plane is determined in following equations.

$$X = h_1 \cdot \tan a + x \cdot \beta_1, \text{ and } Y = h_2 \cdot \tan b + y \cdot \beta_2.$$

Where X and Y represent a distance between the detector and the first side and a distance between the detector and the second side respectively, $h_1$ and $h_2$ represent a distance between the first image acquirer and the detected rectangular plane, and a distance between the second image acquirer and the detected rectangular plane respectively, a represents the shooting angle between the shooting direction of the first image acquirer acquires an image and the extension direction of the detector, b represents the shooting angle between the shooting direction in which the second image acquirer acquires an image and the extension direction of the detector, x represents a distance between the geometrical center of the image captured by the first image acquirer and the first side, y represents a distance between the geometrical center of the image captured by the second image acquirer and the second side, and $\beta_1$ and $\beta_2$ represent the shooting ratio of the first image acquirer and the second image acquirer (i.e., R/r above).

Taking the distance X between the detector and the first side, referring to FIG. 1, $h_1 \cdot \tan a$ represents a distance between the detector 11 and the point P, and also referring to FIG. 5A, $x \cdot \beta_1$ represents a product of the distance between the point P and the side m in the image and the shooting ratio, i.e., the real distance between the point P and the side m; and since the shooting angle of the first image acquirer 121 is perpendicular to the first side, a distance X between the detector 11 and the first side is the sum of the distance between the detector 11 and the point P, and the distance between the point P and the side m. Since the distance Y between the detector 11 and the second side can be calculated in a same way with calculation of the distance X, there is no more detailed description for the distance Y.

In the detecting device, and the method for controlling the same according to the embodiments of the disclosure, at least one image acquirer configured to acquire an image at an adjustable angle is arranged on the body of the detector, and the controller controls the image acquirer to acquire the images of at least two adjacent sides of the detected rectangular plane, and determines the position of the detector on the detected rectangular plane according to the shooting angle of the image acquirer, and the acquired images, so that the position of the detector on the detected rectangular plane being tested can be determined accurately to thereby alleviate an error in testing the detected rectangular plane.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A detecting device, comprising: a controller, and a detector and at least one image acquirer which are electrically connected respectively with the controller, wherein:
the detector comprises a receiver;
the image acquirer is arranged on a side of the detector away from the receiver and has an adjustable shooting angle; and
the controller is configured to control the image acquirer to acquire images of at least two adjacent sides of a detected rectangular plane, and to determine the position of the detector on the detected rectangular plane according to the shooting angle of the image acquirer and acquired images of the sides.

2. The detecting device according to claim 1, wherein the image acquirer comprises:
a first image acquirer configured to acquire an image of a first side of the detected rectangular plane; and
a second image acquirer configured to acquire an image of a second side of the detected rectangular plane, wherein:
the first side and the second side are two adjacent sides of the detected rectangular plane.

3. The detecting device according to claim 2, wherein an orthographic projection of a straight line where a shooting direction of the first image acquirer lies onto the detected rectangular plane is perpendicular to an orthographic projection of a straight line where a shooting direction of the second image acquirer lies, onto the detected rectangular plane.

4. The detecting device according to claim 3, wherein a shooting angle between the first image acquirer and an extension direction of the detector is adjustable; and
a shooting angle between the second image acquirer and an extension direction of the detector is adjustable.

5. The detecting device according to claim 3, wherein the first image acquirer and the second image acquirer are positioned at a same distance from the receiver.

6. The detecting device according to claim 1, wherein the detecting device further comprises: a display component electrically connected with the controller;
the display component is configured to display detection information; and
the controller is further configured to display on the display component a position of the detector on the detected rectangular plane.

7. The detecting device according to claim 1, wherein the detected rectangular plane is a display panel.

8. The detecting device according to claim 1, wherein the detector is an optical detector.

9. A method for controlling the detecting device according to claim 1, the method comprises:
acquiring, by the image acquirer, the images of the at least two adjacent sides of the detected rectangular plane, and determining, by the controller, the position of the detector on the detected rectangular plane according to the shooting angle, and acquired images of the sides.

10. The controlling method according to claim 9, wherein acquiring, by the image acquirer, the images of the at least two adjacent sides of the detected rectangular plane comprises:
acquiring, respectively by a first image acquirer and a second image acquirer which are comprised by the image acquirer, an image of a first side of the detected rectangular plane, and an image of a second side adjacent to the first side.

11. The controlling method according to claim 10, wherein determining, by the controller, the position of the detector on the detected rectangular plane according to the shooting angle and the acquired images of the sides comprises:
determining, by the controller, edge information of the first side and the second side respectively according to the acquired images of the first side and the second side; and
determining, by the controller, the position of the detector on the detected rectangular plane according to the edge information of the first side and the second side, the shooting directions of the first image acquirer and the second image acquirer and shooting ratio; and
wherein the shooting ratio is a ratio of a size of a real object to a size of the real object in the images acquired by the first image acquirer or the second image acquirer.

12. The controlling method according to claim 11, wherein determining, by the controller, the edge information of the first side and the second side respectively according to the acquired images of the first side and the second side comprises:
filtering, by the controller, the images of the first side and the second side respectively;
enhancing, by the controller, edges of filtered images of the first side and the second side respectively; and
detecting, by the controller, enhanced edges of the images of the first side and the second side respectively to determine the edge information of the first side and the second side.

13. The controlling method according to claim 9, wherein acquiring, respectively by the first image acquirer and the second image acquirer, the image of the first side of the detected rectangular plane and the image of the second side adjacent to the first side comprises:
acquiring, by the first image acquirer, the image of the first side in a direction perpendicular to the first side, and acquiring, by the second image acquirer, the image of the second side in a direction perpendicular to the second side.

14. The controlling method according to claim 13, wherein the position of the detector on the detected rectangular plane is determined in equations of:

$$X = h_1 \cdot \tan a + x \cdot \beta_1, \text{ and } Y = h_2 \cdot \tan b + y \cdot \beta_2;$$

wherein X and Y represent a distance between the detector and the first side and a distance between the detector and the second side respectively, $h_1$ and $h_2$ represent a distance between the first image acquirer and the detected rectangular plane and a distance between the second image acquirer and the detected rectangular plane respectively, a represents an angle between the shooting direction of the first image acquirer and an extension direction of the detector, b represents an angle between the shooting direction and an extension direction of the detector, x represents a distance between a geometrical center of the image captured by the first image acquirer and the first side, y represents a distance between a geometrical center of the image captured by the second image acquirer and the second side, and $\beta_1$ and $\beta_2$ represent a shooting ratio of the first image acquirer and a shooting ratio of the second image acquirer.

15. A method for controlling a detecting device, the method comprises:
acquiring images of at least two adjacent sides of a detected rectangular plane, and determining a position of a detector of the detecting device on the detected rectangular plane according to a shooting angle and acquired images of the sides.

16. The controlling method according to claim 15, wherein acquiring the images of the at least two adjacent sides of the detected rectangular plane comprises:
acquiring respectively an image of a first side of the detected rectangular plane, and an image of a second side adjacent to the first side.

17. The controlling method according to claim 16, wherein determining the position of the detector on the detected rectangular plane according to the shooting angle and the acquired images of the sides comprises:
determining edge information of the first side and the second side respectively according to the acquired images of the first side and the second side; and
determining the position of the detector on the detected rectangular plane according to the edge information of the first side and the second side, the shooting directions of a first image acquirer of the detecting device and a second image acquirer of the detecting device and shooting ratio; and
wherein the shooting ratio is a ratio of a size of a real object to a size of the real object in the images acquired by an image acquirer of the detecting device.

18. The controlling method according to claim 17, wherein determining the edge information of the first side and the second side respectively according to the acquired images of the first side and the second side comprises:
filtering the images of the first side and the second side respectively;
enhancing edges of filtered images of the first side and the second side respectively; and
detecting enhanced edges of the images of the first side and the second side respectively to determine the edge information of the first side and the second side.

19. The controlling method according to claim 15, wherein acquiring the image of the first side of the detected rectangular plane and the image of the second side adjacent to the first side comprises:
acquiring the image of the first side in a direction perpendicular to the first side, and acquiring the image of the second side in a direction perpendicular to the second side.

20. The controlling method according to claim 19, wherein the position of the detector on the detected rectangular plane is determined in equations of:

$$X = h_1 \cdot \tan a + x \cdot \beta_1, \text{ and } Y = h_2 \cdot \tan b + y \cdot \beta_2;$$

wherein X and Y represent a distance between the detector and the first side and a distance between the detector and the second side respectively, $h_1$ and $h_2$ represent a distance between the first image acquirer and the detected rectangular plane and a distance between the second image acquirer and the detected rectangular plane respectively, a represents an angle between the shooting direction of the first image acquirer and an extension direction of the detector, b represents an angle between the shooting direction and an extension direction of the detector, x represents a distance between a geometrical center of the image captured by the first image acquirer and the first side, y represents a distance between a geometrical center of the image captured by the second image acquirer and the second side, and $\beta_1$ and $\beta_2$ represent a shooting ratio of the first image acquirer and a shooting ratio of the second image acquirer.

* * * * *